US008536815B2

(12) United States Patent
Vicente et al.

(10) Patent No.: US 8,536,815 B2
(45) Date of Patent: Sep. 17, 2013

(54) METHODS AND SYSTEMS INVOLVING ELECTRIC MACHINE CONTROLLERS

(75) Inventors: Nataniel Barbosa Vicente, Prospect, KY (US); Torsten Brandt, Schenefeld (DE); Todd Elliott Greenwood, Pewee Valley, KY (US); Joachim Mueller, Neumuenster (DE); Srinath Topucharla, Secunderabad (IN)

(73) Assignee: General Electric Company, Schenectady, NY (US)

( * ) Notice: Subject to any disclaimer, the term of this patent is extended or adjusted under 35 U.S.C. 154(b) by 364 days.

(21) Appl. No.: 13/016,249

(22) Filed: Jan. 28, 2011

(65) Prior Publication Data

US 2012/0194118 A1 Aug. 2, 2012

(51) Int. Cl.
*H02P 29/02* (2006.01)

(52) U.S. Cl.
USPC .......... 318/473; 318/430

(58) Field of Classification Search
USPC .......... 318/430, 431, 445, 471, 472, 473, 318/480, 490
See application file for complete search history.

(56) References Cited

U.S. PATENT DOCUMENTS 3,767,901 A * 10/1973 Black et al. .......... 318/568.11
4,109,185 A * 8/1978 Froyd et al. .......... 318/571
4,573,132 A * 2/1986 Boothman et al. .......... 702/132
5,726,911 A * 3/1998 Canada et al. .......... 702/32
5,760,556 A 6/1998 Hamilton, Jr. et al.
7,026,784 B2 * 4/2006 Shimizu et al. .......... 318/400.26
7,369,389 B2 5/2008 Vicente et al.
7,839,617 B2 11/2010 Vicente et al.

* cited by examiner

*Primary Examiner* — Bentsu Ro
(74) *Attorney, Agent, or Firm* — Cantor Colburn LLP

(57) ABSTRACT

A method for operating a controller includes receiving a first accumulated thermal value of an electrical machine and an associated first time stamp from a memory, initializing a processor of the controller with the first accumulated thermal value and the associated first time stamp, determining whether a second time stamp has been received, calculating a difference between the second time stamp and the first time stamp responsive to determining that the second time stamp has been received, calculating a second accumulated thermal value as a function of the first accumulated thermal value, the first time stamp, and the second time stamp, and updating the first accumulated thermal value with the second accumulated thermal value.

20 Claims, 3 Drawing Sheets

METHODS AND SYSTEMS INVOLVING ELECTRIC MACHINE CONTROLLERS

BACKGROUND OF THE INVENTION

The subject matter disclosed herein relates to electric machine controllers and particularly to controlling electric machines with regard to thermal parameters.

Electric machines such as electric motors are often controlled by motor controllers that are operative to drive, monitor, and control the electric motors. Many motor controllers monitor the temperature or thermal content of an electric motor so as to stop or reduce the load of the motor if the thermal content exceeds a threshold value.

BRIEF DESCRIPTION OF THE INVENTION

According to one aspect of the invention, a method for operating a controller includes receiving a first accumulated thermal value of an electrical machine and an associated first time stamp from a memory, initializing a processor of the controller with the first accumulated thermal value and the associated first time stamp, determining whether a second time stamp has been received, calculating a difference between the second time stamp and the first time stamp responsive to determining that the second time stamp has been received, calculating a second accumulated thermal value as a function of the first accumulated thermal value, the first time stamp, and the second time stamp, and updating the first accumulated thermal value with the second accumulated thermal value.

According to another aspect of the invention, a controller apparatus includes a memory, and a processor communicatively connected to the memory, the processor operative to receive a first accumulated thermal value of an electrical machine and an associated first time stamp from the memory, initialize a processor of the controller with the first accumulated thermal value and the associated first time stamp, determine whether a second time stamp has been received, calculate a difference between the second time stamp and the first time stamp responsive to determining that the second time stamp has been received, calculate a second accumulated thermal value as a function of the first accumulated thermal value, the first time stamp, and the second time stamp, and update the first accumulated thermal value with the second accumulated thermal value.

According to yet another aspect of the invention, a system includes a motor, a sensing device, and a controller apparatus including a memory, a processor communicatively connected to the memory and the sensing device, the processor operative to receive an indication of a current in the electrical machine from the sensing device, receive a first accumulated thermal value of an electrical machine and an associated first time stamp from the memory, initialize a processor of the controller with the first accumulated thermal value and the associated first time stamp, determine whether a second time stamp has been received, calculate a difference between the second time stamp and the first time stamp responsive to determining that the second time stamp has been received, calculate a second accumulated thermal value as a function of the first accumulated thermal value, the first time stamp, and the second time stamp, and update the first accumulated thermal value with the second accumulated thermal value.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
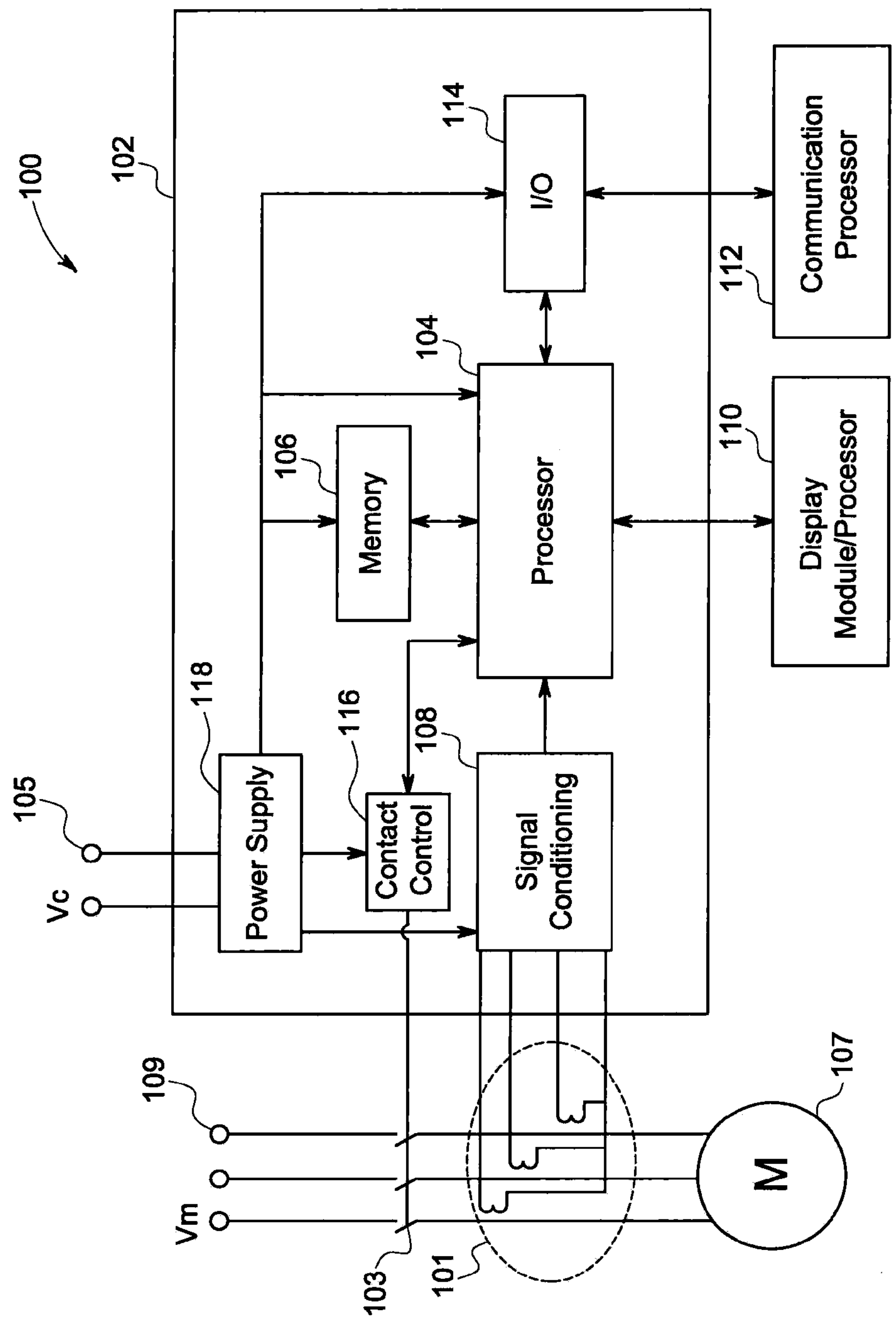
FIG. 1 illustrates a block diagram of a system.

FIG. 1 illustrates a block diagram of a system 100. The system 100 includes a motor controller 102 having a processor 104 that is communicatively connected to a memory device 106 that may include, for example, a non-volatile memory such as, an electrically erasable programmable read-only memory (EEPROM) or flash memory device. The processor 104 includes an internal clock that may be set to a current date and time. The processor 104 is communicatively connected to a sensing device 101 that may include, for example, a transformer device such as a current transformer, voltage transformer, or Rogowski coil device via a signal conditioning portion 108 that is operative to output a sensed current value to the processor 104. The processor 104 may be communicatively connected to a display module 110 that may include a processor, a display, and an input device operative to receive an input from a user. A master communication processor 112 may also be connected to the processor 104 via an input/output portion 114. The processor 104 is operative to control contacts 103 via a contact control portion 116. The portions of the motor controller described above receive power via a power supply 118 from a voltage source Vc 105.

The motor controller 102 is operative to control an electrical motor 107 that receives a voltage from a voltage source Vm 109 by opening and closing the contacts 103. Thus, the motor controller 102 may start and stop the motor 107 by opening and closing the contacts 103. One function of the motor controller is to stop operation of the motor 107 if the heat or thermal content of the motor 107 exceeds a threshold value. For example, if the thermal content of the motor 107 is determined to have exceeded (or possibly exceeded) a designated threshold value, the processor 104 may send a signal to the contact control portion 116 that is operative to open the contacts 103. The processor may allow the contacts 103 to be closed thereby; starting the motor 107 once the processor 104 determines that the thermal content of the motor 107 is less than the threshold value.

In the illustrated embodiment, the processor 104 receives a sensed current value (i) of the motor from the sensing device 101 and estimates the thermal content of the motor 107 as a function of time (t) and the sensed current value. The processor 104 maintains an accumulated thermal value over time in, for example, a register portion of the processor 104. As discussed above, if the accumulated thermal value exceeds a threshold value, the processor 104 may open the contacts 103 and stop the operation of the motor 107.

In some operating situations, the motor controller 102 may loose power. Upon a loss of power, the contacts 103 will open, stopping the motor 107. When power lost to the motor controller 102, the accumulated thermal value that is stored in the processor 107 may be lost. It is desirable to save the accumulated thermal value such that when power is restored to the system 100, a more accurate estimation of the accumulated thermal value may be calculated at the time of restart.

Figure 2:
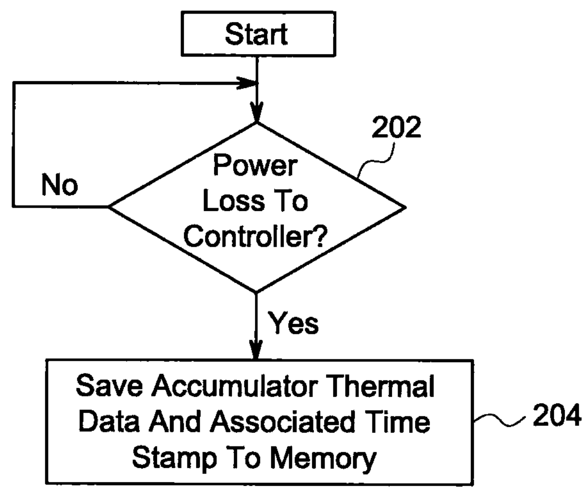
FIG. 2 illustrates a block diagram of an exemplary method of operation of the system of FIG. 1.

In this regard, FIG. 2 illustrates a block diagram of an exemplary method of operation of the system 100. In block 202, if the motor controller 102 (of FIG. 1) looses power, the accumulated thermal value data and the associated present time and date (time stamp) are saved to the memory 106 prior to the shut down of the processor 104. The motor controller 102 may also open the contacts 103 and save the state of the contacts 103 to the memory 106. Thus, upon loss of power to the motor controller 102, the accumulated thermal value and time stamp at the time of shutdown is saved in the non-volatile memory 106.

Figure 3:
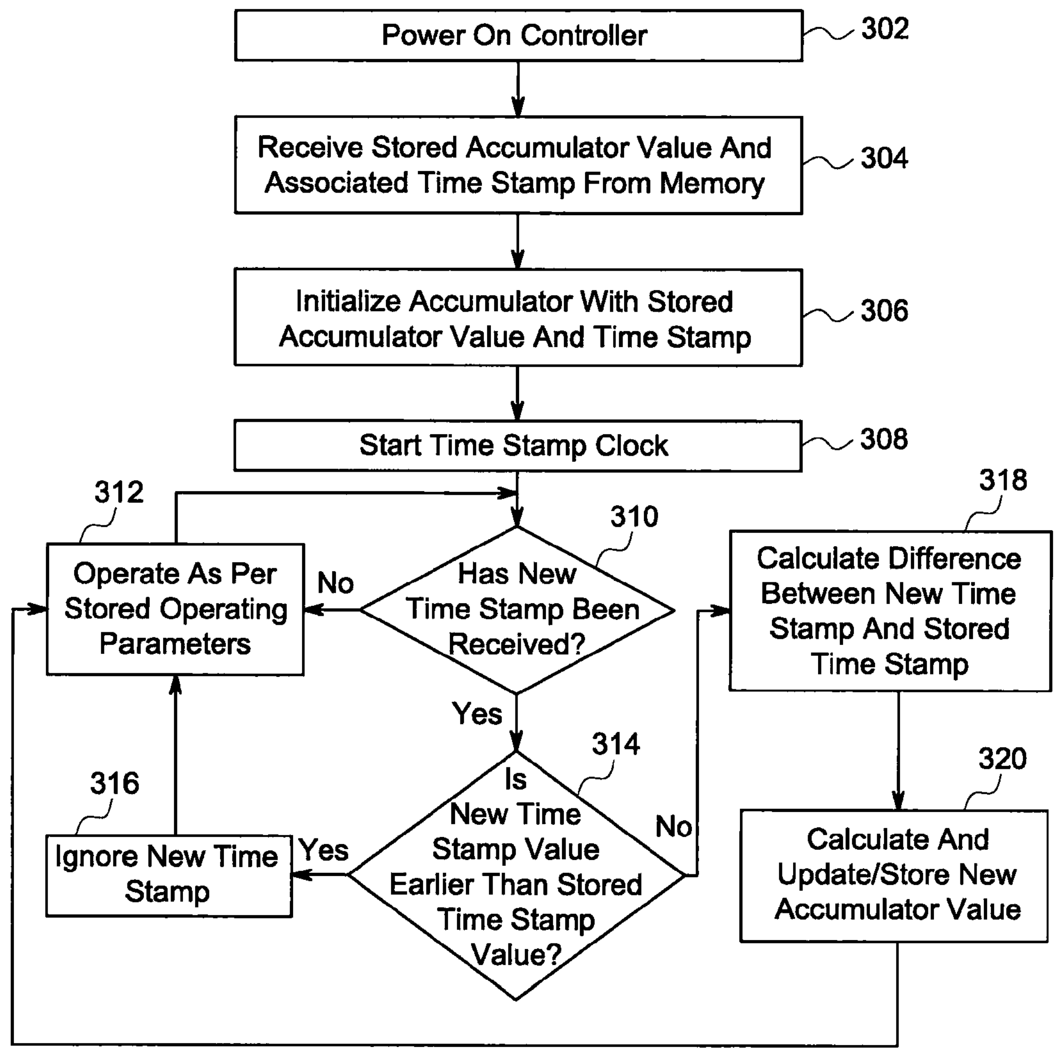
FIG. 3 illustrates a block diagram of an exemplary method for starting the motor controller of FIG. 1.

FIG. 3 illustrates a block diagram of an exemplary method for starting the motor controller 102 (of FIG. 1). In block 302, the motor controller 102 is powered on. In block 304, the processor 104 receives the stored accumulated thermal value ($TV_1$) and time stamp ($Ts_1$) from the memory 106. The processor 104 initializes the accumulator register in the processor 104 with the received accumulated thermal value and time stamp in block 306. In block 308, the time stamp clock is started. The time stamp clock is a function of the internal clock of the processor 104. In block 310, the processor 104 determines whether a new time stamp ($Ts_2$) has been received. For example, the processor 104 may receive the present time and date from an external source such as, an input from a user via the display module 110. Alternatively, the communication processor 112 may send the present date and time to the processor 104. If a new time stamp has not been received by the processor 104, the motor controller 102 may operate as per stored operating parameters in block 312. The stored operating parameters include the accumulated thermal value and time stamp initialized in the accumulator (in block 306). In block 314, the processor 104 determines whether the new time stamp value $Ts_2$ indicates a time prior to the stored time stamp $Ts_1$. (e.g, is ( ) a negative value?) If yes, the new time stamp is ignored in block 316. If no, the difference between the new time stamp and the stored time stamp is calculated in block 318. In block 320, a new accumulated thermal value ($TV_2$) is calculated and stored or updated in the processor 104.

The new accumulated thermal value may be calculated with, for example, the following function: $TV_2=TV_1*((1024*2*Tau*LTCC)-T)/((1024*2*Tau*LTCC)+T)$;

where LTCC is a cooling constant of the motor 107 and $T=Ts_2-Ts_1$. (During the time T, the motor 107 is assumed to be off, such that the no current passes through the motor 107.)

The technical effects and benefits of the illustrated embodiments include a method and system for determining an estimated thermal content of a motor following the loss of power to a motor controller.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for operating a controller, the method comprising:

receiving a first accumulated thermal value of an electrical machine and an associated first time stamp from a memory;

initializing a processor of the controller with the first accumulated thermal value and the associated first time stamp;

determining whether a second time stamp has been received;

calculating a difference between the second time stamp and the first time stamp responsive to determining that the second time stamp has been received;

calculating a second accumulated thermal value as a function of the first accumulated thermal value, the first time stamp, and the second time stamp; and updating the first accumulated thermal value with the second accumulated thermal value.

2. The method of claim 1, wherein the method further comprises:

receiving an indication that the controller has stopped receiving power prior to receiving the first accumulated thermal value of the electrical machine and the associated first time stamp from the memory; and storing the first accumulated thermal value of the electrical machine and the associated first time stamp in the memory responsive to receiving the indication that the motor controller has stopped receiving power.

3. The method of claim 1, wherein the first time stamp is defined by a first clock associated with the processor.

4. The method of claim 1, wherein the second time stamp is received from a second clock.

5. The method of claim 4, wherein the second clock is associated with a second processor.

6. The method of claim 1, wherein the method further comprises starting a time stamp clock following the initialization of the processor.

7. The method of claim 1, wherein the method further comprises entering an operational mode using the first accumulated thermal value and the first time stamp responsive to determining that the second time stamp has not been received.

8. The method of claim 1, wherein the first accumulated thermal value is defined as a function of measured current in the electrical machine and time.

9. A controller apparatus comprising:

a memory; and a processor communicatively connected to the memory, the processor operative to receive a first accumulated thermal value of an electrical machine and an associated first time stamp from the memory, initialize a processor of the controller with the first accumulated thermal value and the associated first time stamp, determine whether a second time stamp has been received, calculate a difference between the second time stamp and the first time stamp responsive to determining that the second time stamp has been received, calculate a second accumulated thermal value as a function of the first accumulated thermal value, the first time stamp, and the second time stamp, and update the first accumulated thermal value with the second accumulated thermal value.

10. The apparatus of claim 9, wherein the processor is further operative to, receive an indication that the controller has stopped receiving power prior to receiving the first accumulated thermal value of the electrical machine and the associated first time stamp from the memory, and store the first accumulated thermal value of the electrical machine and the associated first time stamp in the memory responsive to receiving the indication that the motor controller has stopped receiving power.

11. The apparatus of claim 9, wherein the first time stamp is defined by a first clock associated with the processor.

12. The apparatus of claim 9, wherein the second time stamp is received from a second clock.

13. The apparatus of claim 12, wherein the second clock is associated with a second processor.

14. The apparatus of claim 9, wherein the processor is further operative to start a time stamp clock following the initialization of the processor.

15. The apparatus of claim 9, wherein the processor is further operative to enter an operational mode using the first accumulated thermal value and the first time stamp responsive to determining that the second time stamp has not been received.

16. The apparatus of claim 9, wherein the first accumulated thermal value is defined as a function of measured current in the electrical machine and time.

17. A system comprising:

an electrical machine;

a sensing device; and a controller apparatus comprising:

a memory; and a processor communicatively connected to the memory and the sensing device, the processor operative to receive an indication of a current in the electrical machine from the sensing device, receive a first accumulated thermal value of an electrical machine and an associated first time stamp from the memory, initialize a processor of the controller with the first accumulated thermal value and the associated first time stamp, determine whether a second time stamp has been received, calculate a difference between the second time stamp and the first time stamp responsive to determining that the second time stamp has been received, calculate a second accumulated thermal value as a function of the first accumulated thermal value, the first time stamp, and the second time stamp, and update the first accumulated thermal value with the second accumulated thermal value.

18. The system of claim 17, wherein the processor is further operative to, receive an indication that the controller has stopped receiving power prior to receiving the first accumulated thermal value of the electrical machine and the associated first time stamp from the memory, and store the first accumulated thermal value of the electrical machine and the associated first time stamp in the memory responsive to receiving the indication that the motor controller has stopped receiving power.

19. The apparatus of claim 17, wherein the first time stamp is defined by a first clock associated with the processor.

20. The apparatus of claim 17, wherein the second time stamp is received from a second clock.

* * * * *

UNITED STATES PATENT AND TRADEMARK OFFICE

CERTIFICATE OF CORRECTION

PATENT NO. : 8,536,815 B2
APPLICATION NO. : 13/016249
DATED : September 17, 2013
INVENTOR(S) : Vicente et al.

It is certified that error appears in the above-identified patent and that said Letters Patent is hereby corrected as shown below:

In the Specifications

In Column 3, Line 2, delete "processor 107" and insert -- processor 104 --, therefor.

In Column 3, Line 39, delete "(e.g," and insert -- (e.g., --, therefor.

In the Claims

In Column 6, Line 24, in Claim 19, delete "The apparatus" and insert -- The system --, therefor.

In Column 6, Line 26, in Claim 20, delete "The apparatus" and insert -- The system --, therefor.

Signed and Sealed this
Twenty-eighth Day of January, 2014

Michelle K. Lee
*Deputy Director of the United States Patent and Trademark Office*